United States Patent [19]

Alvarez et al.

[11] 4,124,194
[45] Nov. 7, 1978

[54] METALLIC SEAT CONSTRUCTION FOR VALVES

[75] Inventors: Patricio D. Alvarez, Rosenberg; Robert C. Houlgrave; Manmohan S. Kalsi, both of Houston, all of Tex.

[73] Assignee: ACF Industries, Incorporated, New York, N.Y.

[21] Appl. No.: 807,852

[22] Filed: Jun. 20, 1977

[51] Int. Cl.$^2$ .............................................. F16K 25/00
[52] U.S. Cl. ................................. 251/159; 251/174; 251/328; 251/359
[58] Field of Search ............... 251/159, 172, 174, 328, 251/359

[56] References Cited

U.S. PATENT DOCUMENTS

| 1,488,296 | 3/1924 | Stevens | 251/174 |
| 2,191,232 | 2/1940 | Heinen | 251/174 |
| 3,006,601 | 10/1961 | Anderson | 251/196 |
| 3,204,924 | 9/1965 | Bredtschneider | 251/172 X |
| 3,273,855 | 9/1966 | Wells | 251/174 X |
| 3,667,727 | 6/1972 | Bowden | 251/172 |

Primary Examiner—Harold W. Weakley
Attorney, Agent, or Firm—Eugene N. Riddle

[57] ABSTRACT

A metallic seat assembly for a gate valve includes an annular seat pocket around the flow passageways to the valve chamber with a metallic annular seat support member rigidly mounted in the seat pocket and a metallic annular seat member movably mounted inside the seat support member and connected thereto by a resilient and flexible annular metallic member. The resilient annular member is secured continuously around its inner and outer perimeters to the seat support member and the seat member respectively and it functions as a spring to bias the seat member toward the gate and as a seal between the seat member and the supporting member. The resilient and flexible member permits axial movement of the seat member relative to the seat support member and also compensates for thermal expansion and contraction of the seat member and the seat support member relative to each other. The metallic seat member has an integral metallic sealing lip extending from an annular groove around the sealing face of the seat member. The metallic lip has its free end extending beyond the planar sealing face when in the free position and can be deflected completely into the groove upon contact with a movable valve member.

9 Claims, 4 Drawing Figures

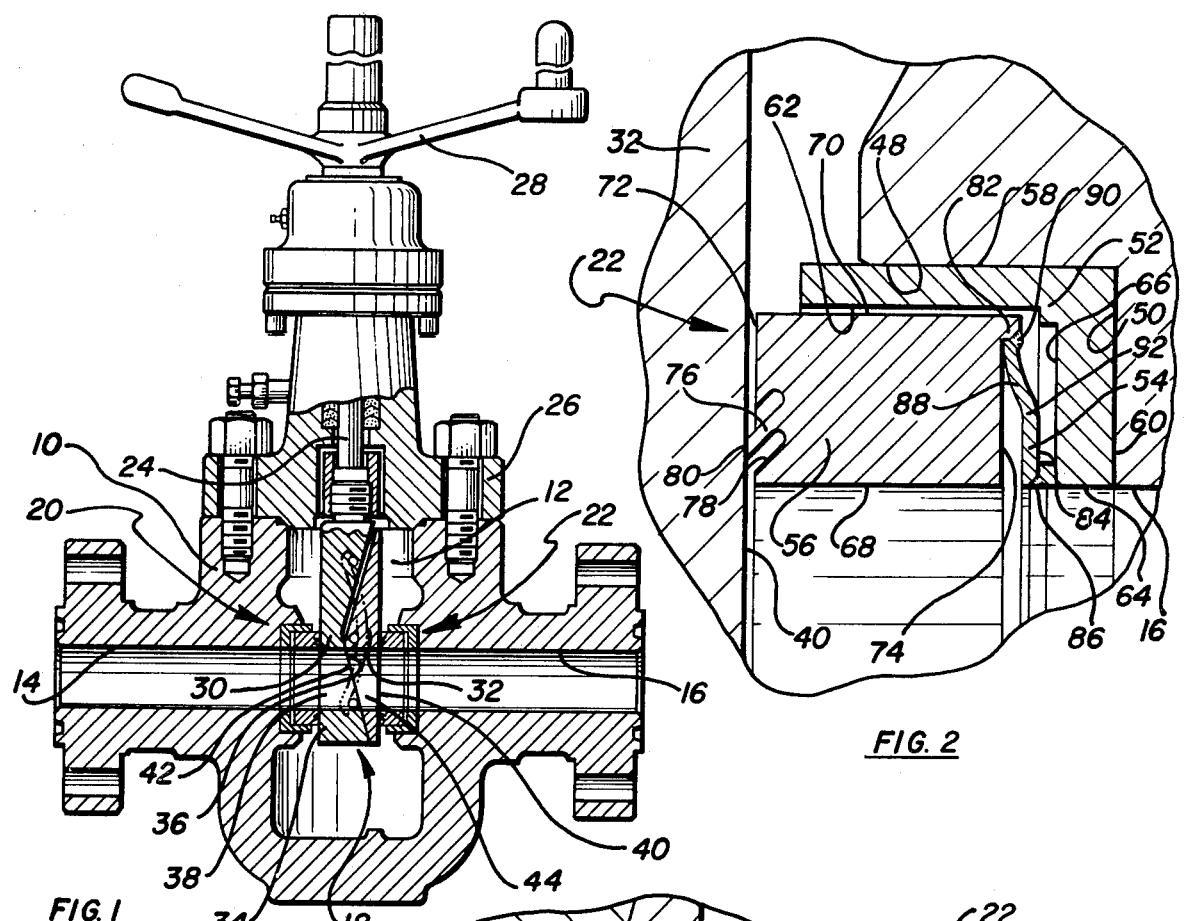
FIG. 1
FIG. 2
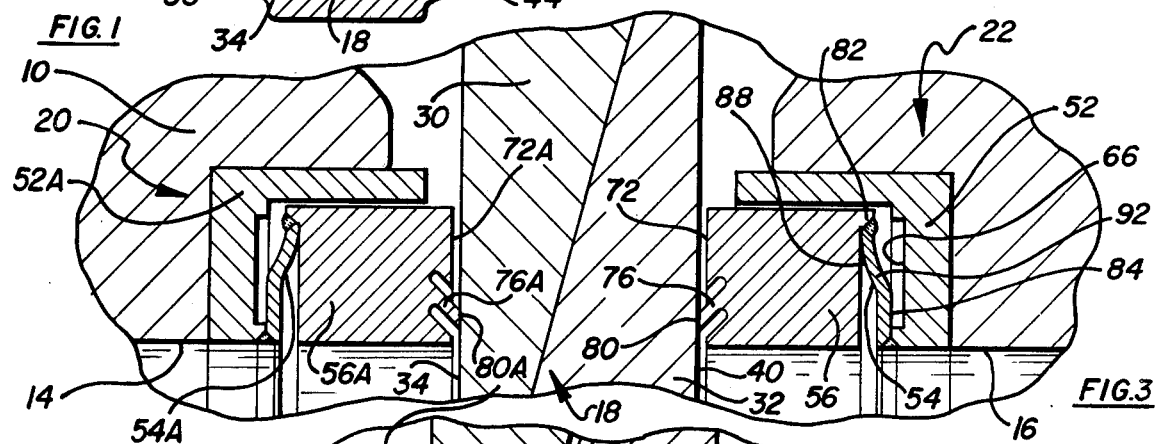
FIG. 3
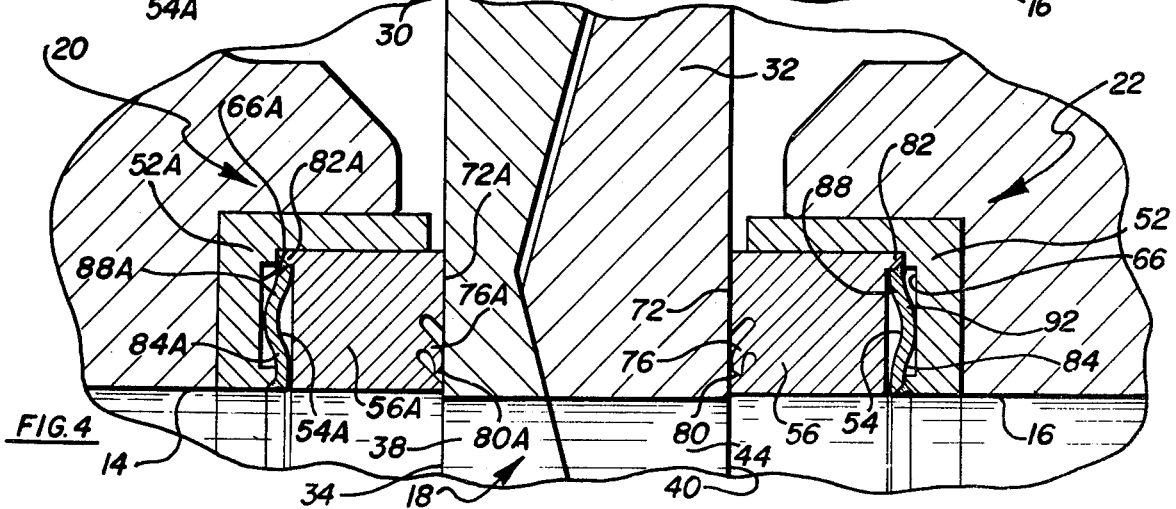
FIG. 4

METALLIC SEAT CONSTRUCTION FOR VALVES

BACKGROUND OF THE INVENTION

This invention is related to metallic seats for valves. More specifically this invention is related to completely metal seat assemblies for gate valves wherein the seat is constructed for use in a high temperature service and where the seat provides a primary sealing element for low pressures and a secondary seating element for higher pressures.

Several types of all metallic or mostly metallic gate valve seat assemblies are known in the prior art. The following list of patents is exemplary of the known metallic gate valve seat assemblies:

| Patent No. | Date | Inventor | Title |
| --- | --- | --- | --- |
| 1,488,296 | March 25, 1924 | H. P. Stevens | Packing Ring |
| 1,489,857 | April 8, 1924 | H. P. Stevens | Packing Ring |
| 1,736,261 | Nov. 19, 1929 | G. E. A. Hallett | Fluid Seal Intermittingly Registering Conduits |
| 2,772,848 | Dec. 4, 1956 | T. H. Holzer et al | Fluid Seal Element |
| 2,777,664 | Jan. 15, 1957 | A. U. Bryant | Valve Construction |

The metallic valve seat constructions shown in these patents are generally complicated structures which must be welded to or otherwise fixed to the valve body and which provide only a principle sealing element or surface to contact the gate member. In each of these seat constructions only one seal element is provided to contact the gate member; however, they do not provide supporting structure of sufficient strength to seal against and support an expanding or wedging gate member nor do they provide the combination of a positive primary and secondary seal.

SUMMARY OF THE INVENTION

The valve seat assembly of this invention includes an annular seat support member which is rigidly mounted in a seat pocket of a gate valve. The seat pockets in this valve open to the valve chamber and to the flow passageways. An annular seat member is axially movably mounted in the seat support member by an annular flexible and radially disposed member which functions as a spring to urge the seat member outward to engage the gate member and which functions as a seal between the seat member and the seat support member. The seat member is provided with an annular planar sealing face and a cantilever seal member extending from a groove around the annular planar sealing face. The free end of the cantilever seal member extends beyond the planar sealing face for contact with the gate member.

One object of this invention is to provide an all metal gate valve seat structure overcoming the aforementioned disadvantages of the prior art devices.

Still, one other object of this invention is to provide a metal seat structure for a gate valve which has an axially movable seat member that is urged toward the gate member by a metallic spring with the seat having a deformable face seal element functioning as a primary seal and extending beyond the planar sealing face of the seat member.

Another object of this invention is to provide an all metal gate valve seal assembly which can be pressed into the seat pocket of a gate valve that has a laterally expandable gate assembly to seal when the gate assembly is in a collapsed condition as well as in an expanded condition.

Various other objects, advantages, and features of this invention will become apparent to those skilled in the art from the following discussion, taken in conjunction with the accompanying drawings, in which:

DESCRIPTION OF THE DRAWINGS

FIG. 1 is a cross-sectional elevation view of a gate valve having an expanding gate assembly and employing the seat construction of this invention with the valve shown in the closed position and the gate assembly in a collapsed condition;

FIG. 2 is an enlarged cross-sectional fragmental view of a portion of the gate valve body, the gate, and the seat assembly of this invention taken with the valve in the position as shown in FIG. 1;

FIG. 3 is an enlarged fragmental view of a portion of the gate and both seats from the valve shown in FIG. 1, with the gate assembly shown in the closed position, centered between the seats, and collapsed; and FIG. 4 is an enlarged fragmental view similar to FIG. 3 and with the gate assembly in the expanded condition and in the open position.

The following discussion and description of preferred specific embodiments of the metal gate valve seat structure of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a gate valve employing the novel metal seat structure of this invention. The gate valve includes a valve body 10 having a valve chamber 12 therein with flow passageways 14 and 16 through the valve body communicating with the valve chamber. An expanding parallel sided type gate assembly indicated generally at 18 is mounted in the valve chamber between flow passageways 14 and 16. A pair of seat assemblies 20 and 22 are mounted around the respective flow passageways 14 and 16 and reside in contact with gate assembly 18. A valve stem 24 is secured on to the upper end of gate assembly 18 and extends through a valve bonnet 26 which is mounted on valve body 10. An operator in the form of a handwheel 28 is shown on the upper end of valve stem 24 for moving the gate assembly between open and closed positions.

Gate assembly 18 includes a gate member 30 and a segment 32 which move together as a unit and expand laterally in the open and closed positions to insure positive engagement with the valve seats for fluid-tight sealing in the open and closed positions. Gate 30 has a flat sealing surface 34 on the side which contacts seat assembly 20, a notch 36 transversely across the opposite side thereof, and an opening 38 through the lower end of the member. Stem 24 is secured to the upper end of gate 30. Segment 32 has a flat sealing surface 40 on one side which contacts seat assembly 22, an inclined surface 42 extending outwardly and transverse to the segment on the opposite side to engage gate notch 36. An opening 44 through the lower end of segment 32 aligns with the gate opening 38 when gate assembly 18 is in the open position. It is important to note that in this style of valve the sealing surfaces 34 and 40 are substantially parallel when gate assembly 18 is expanded in both the open and closed positions and these sealing surfaces are more or less parallel when gate assembly 18 is in the collapsed position as shown in FIG. 1. Movement of gate assembly 18 to either the closed or the open position brings segment 32 into contact with lower or upper stops inside the valve body so continued displacement of gate 30 wedges gate assembly 18 between the seat members because of the sliding of gate 30 relative to segment 32. The upper stop is the inside surface of the valve body bonnet outward of the stem and stem-gate coupler passageway. The lower stop is a protrusion in the bottom of the valve chamber.

Seat assemblies 20 and 22 are identical and for convenience in the discussion only seat assembly 22 will be described in detail. The seat pocket or recess for the seat assembly 22 includes an annular wall 48 which is coaxial with fluid passageway 16 and joins a radially disposed seat pocket and wall 50 on one end and the valve chamber on the opposite end thereof. Radially disposed wall 50 is substantially perpendicular to flow passageway 16. Seat assembly 22 comprises a seat support member 52 which is joined by a flexible member 54 to a seat member 56. Seat support member 52 is an annular member having a generally cross-section "L" shape and receiving the seat member 56 in the interior thereof. Seat support member 52 has one leg defining a generally cylindrical outer wall 58 which is substantially perpendicular to the other leg defining a radially disposed end wall 60. Seat support member outer wall 58 rests in flush contact with seat pocket outer wall 48 in an interference fit so the seat assembly is retained in the valve body. The interior of seat support member 52 includes a cross-sectionally round interior wall 62 extending from the open end of the member to a radially disposed inner wall at the interior of the radially disposed portion. This radially disposed inner wall terminates at an opening 64 which is substantially aligned with fluid passageway 16. The seat support member inner wall is provided with a recess or cutaway portion 66 through a mid-portion thereof to receive a flexible member 54. Seat member 56 is an annular member having the interior opening 68 generally aligning with the flow passageway 16, and including a generally cylindrical outer surface 70, a substantially planar sealing surface 72 adjacent to gate assembly 18, and a rear wall 74 on the side opposite to the sealing face. Seat member 56 also has a lip seal member 76 extending from an annular groove 78 around a mid-portion of sealing face 72. Lip seal member 76 extends outwardly in a generally frusto-conical shape from the bottom portion of the groove 78 and terminates at a tip 80 which extends beyond sealing face 72 when lip seal member 76 is in a free position. Lip seal member 76 is substantially wider at the root portion which is in the bottom of groove 78 than at tip 80. Tip 80 is smaller in radial diameter than the root portion of seal member 76. Perferably lip seal member 76 is positioned around a radially inner portion of sealing face 72. Groove 78 is sufficiently wide to permit deflection of lip seal member 76 completely into groove 78 when seat sealing face 72 is in flush contact with the gate assembly sealing surface. In this completely deflected position no portion of lip seal member 76 contacts the side of groove 78.

Seat member cylindrical outer surface 70 is spaced slightly from seat support member annular inner wall 62 so that seat member 56 can move longitudinally within seat support member 52. This spacing must necessarily be sufficient to permit movement of seat member 56 at room temperature and at an extremely elevated temperature such as above 1,000° F. or at a substantially reduced temperature such as −50° F. Seat member rear wall 74 is provided with a longitudinally extending peripheral ridge 82 around the outer peripheral portion thereof. Ridge 82 serves as an attachment point for flexible member 54 and a stop to contact seat support member 52.

Flexible member 54 is a combination spring and seal member connecting seat support member 52 and seat member 56 to provide a seal between the two members and a spring action to urge seat member 56 outward to contact gate assembly 18. Flexible member 54 has a radially inner portion 84 which is secured to seat support member 52 by an annular weld 86 around the opening of the seat support member. The radially outer portion 88 of flexible member 54 is secured to seat member ridge 82 by an annular weld 90. Welds 86 and 90 secure flexible member 54 and provide for fluid-tight sealing between seat support member 52 and seat member 56. The mid-portion of flexible member 54 has a radially and longitudinally flexible portion indicated at 92. Flexible member mid-portion 92 is shown as being a generally longitudinally oriented segment of the flexible member joined with radially disposed portions 84 and 88 by smooth contours. This arrangement of flexible member 54 provides for radial expansion and contraction of seat member 56 relative to seat support member 52 as well as providing sufficient stiffness for flexible member 54 to function adequately as a spring. Recess 66 in seat support member is sufficiently large to accommodate flexible member mid-portion 92 and adjoining sections of the member when seat member 56 is positioned as far as possible inside seat support member 52. In this retracted position seat member ridge portion 82 rests in firm contact with the inner end wall of seat support member 52. This condition occurs when the gate assembly 18 is expanded in either the open or closed position.

FIG. 3 shows a portion of gate assembly 18 and both seat assemblies 20 and 22 in a portion of valve body 10 wherein the gate assembly is in a substantially closed position and in the collapsed condition. In normal use the valve does not assume the position shown in FIG. 3 except for a brief time before the gate assembly is expanded to seal between the seats, however, the position is useful for illustration purposes. In this collapsed condition, gate 30 and segment 32 are in their narrowest possible configuration. Because seat assemblies 20 and 22 are the same the individual parts of seat assembly 20 are indicated by the same numerals as seat assembly 22 followed by the capital letter "A." With the gate assembly in this collapsed condition, the gate and segment sealing surfaces 34 and 40 respectively are substantially parallel and the cantilever seal member tips 80 and 80A rest in sealing contact with gate assembly surfaces 40 and 34. Seat members 56 and 56A are urged inwardly or toward gate assembly 18 by the flexible members 54 and 54A respectively. Seat member sealing surfaces 72 and 72A are slightly spaced from the segment and gate sealing surfaces because seal tips 80 and 80A extend beyond surfaces 72 and 72A. Cantilever seal members 76 and 76A are deflected slightly because of the bias of flexible members 54 and 54A. In use when the valve is positioned as shown in FIG. 3 and fluid pressure is on the upstream side then gate assembly 18 is moved in the downstream direction. When this occurs, the flexible member on the downstream side will be compressed and deflected to permit movement of the downstream seat member into the downstream seat support member while on the other side of the gate assembly the upstream seat member will move in the downstream direction with the gate assembly due to the bias of the associated flexible member. The overall result is that the seal member tips 80 and 80A remain in contact with sealing surfaces 40 and 34 respectively on the gate assembly. On the upstream side of the valve, fluid pressure in the flowline will assist in sealing because fluid under pressure can enter the space between flexible member 54A and the back side of seat 56A. On the downstream side of the valve the pressure in the downstream passageway is usually less than the pressure in the valve body, therefore, fluid under pressure will enter the space between the seat member and the seat support member radially outward of the flexible member and urge the seat member toward the gate assembly.

FIG. 4 shows the valve in the open position with gate assembly 18 in the expanded condition. With gate assembly 18 moving into this expanded position, segment 32 first contacts the upper stop inside the valve chamber and gate 30 is displaced slightly further after segment 32 contacts the upper stop and gate 30 slides on segment 32 so a small resultant space appears between gate 30 and segment 32 on one side of the adjoining inclined surfaces. With gate assembly 18 in the expanded position, seat members 56 and 56A are displaced apart relative to each other and into the bottom portion of the respective seat support members. When this occurs flexible members 54 and 54A are deflected into the recesses 66 and 66A. Additionally, the gate and segment sealing surfaces 34 and 40 rest in flush surface-to-surface contact with the seat member sealing surfaces 72A and 72 respectively and the cantilever seal members 76A and 76 are displaced into their respective grooves. It is to be noted that when the cantilever seal members are deflected into the grooves the lip portions of these members do not contact the sides of the groove. It is important to the integrity of the seal that the tips 80 and 80A are not damaged so they will seal properly when needed. Also, in this expanded position the seat peripheral ridges 82 and 82A rest in contact with the radially outer portion of the internal radially disposed wall portion of the respective seat support members. The seat members in this position rest solidly against the seat support members and because the seat support members are rigidly mounted in the valve body then the gate assembly 18 can expand into flush surface contact against a substantially solid or rigid seat surface. Expansion of gate assembly 18 creates a metal-to-metal seal between the seat members and the gate and segment. Flexible members 54 and 54A provide a fluid seal between the seat support members and the seat members and because the seat support members are pressed into their respective seat pockets the result is a metal-to-metal fluid-tight seal between the gate assembly and the flow passageways of the valve body. It is to be noted that although gate assembly 18 is shown expanded and sealed in the open position it will also expand and seal in the same manner in the closed position.

At this point it is to be noted that operation of the valve utilizing this novel seat construction can be operated at high temperatures without effecting the performance of these seat structures. Because of the metallic configuration of the seat assemblies elevated temperatures will not consume the materials which make up the seat assemblies. Additionally, the flexible members and the seat members must necessarily be selected of a material which will retain a substantial degree of resiliency when exposed to elevated temperatures so the flexible members can bias the seat members to contact with the gate assembly in all operating conditions. Also, this selection of material will allow the lip seal members to be displaced from the position shown in FIG. 4 to the position shown in FIG. 3 when the valve is exposed to elevated temperatures. It is to be noted that the radially flexible mid-portion of the flexible members allows for radial compensation for size changes of the seat members and the respective seat support members due to elevated temperatures. This feature of the seat assembly is necessary to prevent tearing of the welds that secure the flexible member which would happen due to the relative size changes of the members with a substantial change in temperature thereof. It is to be noted that as mentioned above the seat members are spaced radially inward of the outer portion of the seat support members so that floating movement of the seat members in the longitudinal direction of the passageways is possible at room temperature and at elevated temperatures.

It is to be noted that although this seat construction is shown with a gate valve it can be used on ball valves, plug valves and globe valves where the valve member is always in contact with the seat assembly.

What is claimed is:

1. A metallic seat assembly for a gate valve having a valve body with inlet and outlet passageways communicating with a valve chamber and a gate valve member mounted in said valve chamber movable between open and closed positions, said seat assembly comprising:
   (a) an annular seat pocket around one of said passageways and opening to said valve chamber;
   (b) an annular seat member mounted in said seat pocket and having a front face sealingly engagable with said valve member;
   (c) an annular groove in said seat member around a mid-portion of said front face such that a portion of said front face lies radially inside said groove and another portion of said front face lies radially outside of said groove; and
   (d) a lip integral with said seat member and extending from the closed end of said groove through said groove with the unattached end of said lip extending beyond said seat front face when said lip is in a free position, said lip normally resting in sealing contact with said valve member and said lip being deflectable completely into said groove such that said seat front face can engage said gate valve member in flush surface contact.

2. A metallic seat assembly for a valve having a valve body with inlet and outlet passageways communicating with a valve chamber and a valve member mounted in said valve chamber movable between open and closed positions, said seat assembly comprising:

an annular seat pocket around one of said passageways and opening to said valve chamber;
an outer annular seat support member mounted in said seat pocket;
an inner annular seat member received within said outer seat support member and adapted for longitudinal movement in the seat support member toward and away from the valve member; and
an annular flexible member between the outer seat support member and the inner seat member, said flexible member being secured adjacent one peripheral portion to said seat support member and secured adjacent the other peripheral portion to said seat member, said seat member having an annular planar sealing face and an annular face seal engageable with said valve member extending from said sealing face, said face seal having a lip seal element integral with the seat member with the free end of said lip seal element extending beyond said sealing face, said lip seal element being substantially wider in cross-section at a root portion thereof than at said free end and having a generally frusto-conical shape with said free end being at the smaller diameter portion thereof, said seat member having an annular groove in said planar sealing face with said lip seal element extending from the bottom of said groove and said groove being of sufficient width so that said lip seal element can be deflected to be completely enclosed inside said groove without contacting either side of said groove.

3. A metallic seat assembly as set forth in claim 2 wherein said groove is of sufficient width that said lip can be deflected to be entirely received within said groove.

4. A metallic seat assembly for a gate valve having a valve body with inlet and outlet passageways communicating with a valve chamber and a gate valve member mounted in said valve chamber movable between open and closed positions, said seat assembly comprising:
an annular seat pocket around one of said passageways and opening to said valve chamber;
a metallic annular seat member mounted in said seat pocket and having a front face sealingly engageable with said valve member;
a metallic lip integral with said metallic seat member extending from said front face with the unattached free end of said lip extending beyond said seat front face when said lip is in a free position; and
an annular groove in said seat member adjacent said metal lip, said lip normally resting in sealing contact with said valve member and said lip being deflectable into said groove such that said seat front face can engage said gate valve member in flush surface contact.

5. A metallic seat assembly as set forth in claim 4 wherein said metal lip is substantially wider in cross section at a root portion thereof than at said free end.

6. In an expanding gate valve structure having a valve body with inlet and outlet passageways communicating with a valve chamber therein and an annular recess about each passageway, and a gate assembly mounted in said valve chamber for movement between open and closed positions and including a gate and a segment carried thereby expanding away from each other at the open and closed positions;
an improved metallic seat assembly within each annular recess, said seat assembly comprising:
an outer generally L-shaped annular seat support member press fitted in a fixed position within the associated recess and defining inner and outer legs in generally flush contact with the walls defining the recess;
an inner metallic seat member mounted within the seat support member for floating movement relative to the outer seat support; and
an annular flexible spring member between the outer seat support member and the inner seat member and having a relatively thin cross-section, said flexible spring being secured adjacent its inner periphery to the inner leg of said seat support member and secured adjacent its outer periphery to said seat member, said inner seat member engaging the outer seat support member in abutting relation upon expanding of said gate valve assembly at the fully closed position of the gate assembly.

7. In an expanding gate valve structure as set forth in claim 6 wherein the inner leg of said seat support extends to the adjacent passageway and said flexible member is secured to said inner leg by a weld at said adjacent passageway.

8. In a gate valve having a valve body with inlet and outlet passageways communicating with a valve chamber therein and an annular recess about each passageway, and a gate mounted in said valve chamber for movement between open and closed positions;
an improved metallic seat assembly within each annular recess, said seat assembly comprising:
an outer generally L-shaped annular seat support member press fitted in a fixed position within the associated recess and defining inner and outer legs in generally flush contact with the walls defining the recess;
an inner metallic seat member mounted within the seat support member for floating movement relative to the outer seat support; and
an annular flexible spring member between the outer seat support member and the inner seat member and having a relatively thin cross-section, said flexible spring being secured adjacent its inner periphery to the inner leg of said seat support member and secured adjacent its outer periphery to said seat member, said inner seat member adapted to engage the outer seat support member in abutting relation upon movement toward said seat support member.

9. In an expanding gate valve structure having a valve body with inlet and outlet passageways communicating with a valve chamber therein and an annular recess about each passageway, and a gate assembly mounted in said valve chamber for movement between open and closed positions and including a gate and a segment carried thereby expanding away from each other at the open and closed positions;
an improved metallic seat assembly within each annular recess, said seat assembly comprising:
a metallic annular seat member mounted in each recess and having a front face sealingly engageable with said gate assembly;
a metallic lip integral with said metallic seat member extending from said front face with the unattached free end of said lip extending beyond said seat front face when said lip is in a free position; and
an annular groove in said seat member adjacent said metal lip, said lip normally resting in sealing contact with said gate assembly and said lip being deflectable into said groove such that said seat front face can engage said gate assembly in flush surface contact, said metal lip being substantially wider in cross section at a root portion thereof than at said free end.

* * * * *